(12) United States Patent
Hussain et al.

(10) Patent No.: US 11,429,485 B1
(45) Date of Patent: Aug. 30, 2022

(54) MEMORIES WITH END-TO-END DATA PROTECTION USING PHYSICAL LOCATION CHECK

(71) Applicant: Western Digital Technologies, Inc., San Jose, CA (US)

(72) Inventors: Atif Hussain, Denver, CO (US); Robert Ellis, Phoenix, AZ (US); Vivek Shivhare, San Jose, CA (US); Stephen Gold, Fort Collins, CO (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/357,759

(22) Filed: Jun. 24, 2021

(51) Int. Cl.
*G11C 29/00* (2006.01)
*G06F 11/10* (2006.01)
*G06F 12/02* (2006.01)
*G06F 11/07* (2006.01)

(52) U.S. Cl.
CPC ...... *G06F 11/1068* (2013.01); *G06F 11/0772* (2013.01); *G06F 11/1004* (2013.01); *G06F 12/0246* (2013.01); *G06F 2212/7201* (2013.01)

(58) Field of Classification Search
CPC ............. G06F 11/1068; G06F 11/1004; G06F 11/0772; G06F 12/0246; G06F 2212/7201
See application file for complete search history.

(56) References Cited

U.S. PATENT DOCUMENTS

| | | | |
|---|---|---|---|
| 8,255,617 B2 | 8/2012 | Goss et al. | |
| 9,430,329 B2 | 8/2016 | Trantham | |
| 9,727,263 B2 | 8/2017 | Bennett | |
| 10,838,858 B2 | 11/2020 | Koo | |
| 2013/0283126 A1* | 10/2013 | Ramaraju | G06F 12/0895 714/763 |
| 2015/0286524 A1* | 10/2015 | Trantham | G06F 11/108 714/766 |
| 2017/0206028 A1* | 7/2017 | O | G06F 12/0884 |

* cited by examiner

*Primary Examiner* — Samir W Rizk
(74) *Attorney, Agent, or Firm* — ArentFox Schiff LLP

(57) ABSTRACT

Memories using end-to-end data protection using physical location checks are described. In one aspect, a storage device includes non-volatile memory and a controller coupled to the memory. The controller may receive a write instruction including a data word and a logical address, include metadata with the word including error correction data, identify a physical address in a mapping table based on the logical address, generate a tag corresponding to the physical address, and replace the error correction data with the generated tag or a value based thereon before writing the data word to memory. In one embodiment, the controller may generate the tag concurrently with performing a logical error check using the error correction data.

20 Claims, 6 Drawing Sheets

MEMORIES WITH END-TO-END DATA PROTECTION USING PHYSICAL LOCATION CHECK

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of NAND or NOR cells on one or more dies. Flash memory may be found in solid-state devices (SSDs), Secure Digital (SD) cards, and the like.

When a host issues initial write operations to a controller in a conventional non-volatile memory system, the storage controller appends to the corresponding data word certain metadata, such as cyclic redundancy check (CRC) data, to enable logical data checks to be performed. These checks can help ensure that data integrity is maintained while the controller performs different pre-storage operations, such as performing logical checks on the data, and performing the physical address lookup. Prior to this lookup, however, the controller lacks any information that identifies the data word's intended physical storage location. Problems can therefore arise if the code word is physically corrupted at this pre-storage stage, because the data word may still match the same logical block address (LBA) and the checksums may pass logical error detection checks. The wrong data, or wrong versions of the same, may be sent to the host as a consequence, without knowledge by the controller of the corruption.

SUMMARY

One aspect of a storage device is disclosed herein. The storage device may include a memory including non-volatile memory elements for storing data. The storage device may also include a controller coupled to the memory. The controller may be configured to receive a write instruction including a data word and a logical address. The controller may include, with the data word metadata including error detection data. The controller may identify a physical address in a mapping table based on the logical address, and generate a tag corresponding to the identified physical address. The controller may replace the error detection data with the generated tag or a value based thereon before writing the data word to the physical address in the memory.

Another aspect of a storage device is disclosed herein. The storage device may include a plurality of non-volatile memory elements for storing data. The storage device may also include a controller. The controller may be configured to perform a logical check on a data word included in a write instruction from a host, including comparing an error detection code in the data word to another value. The controller may identify a physical address for writing the data word when the logical check passes. The controller may generate, during the logical check, a tag using the physical address. The controller may replace the code with the tag before writing the data word to the physical address. The storage device may include Still another aspect of a storage device is disclosed herein a plurality of non-volatile memory locations for storing data. The storage device may also include a controller. The controller may be configured to generate an error code to include with data received in a write request. The controller may further be configured to identify a physical address based on a logical address included with the write request. The controller may also be configured to replace the error code with a tag identifying the physical address. The controller may write the data with the replaced error code to the physical address.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
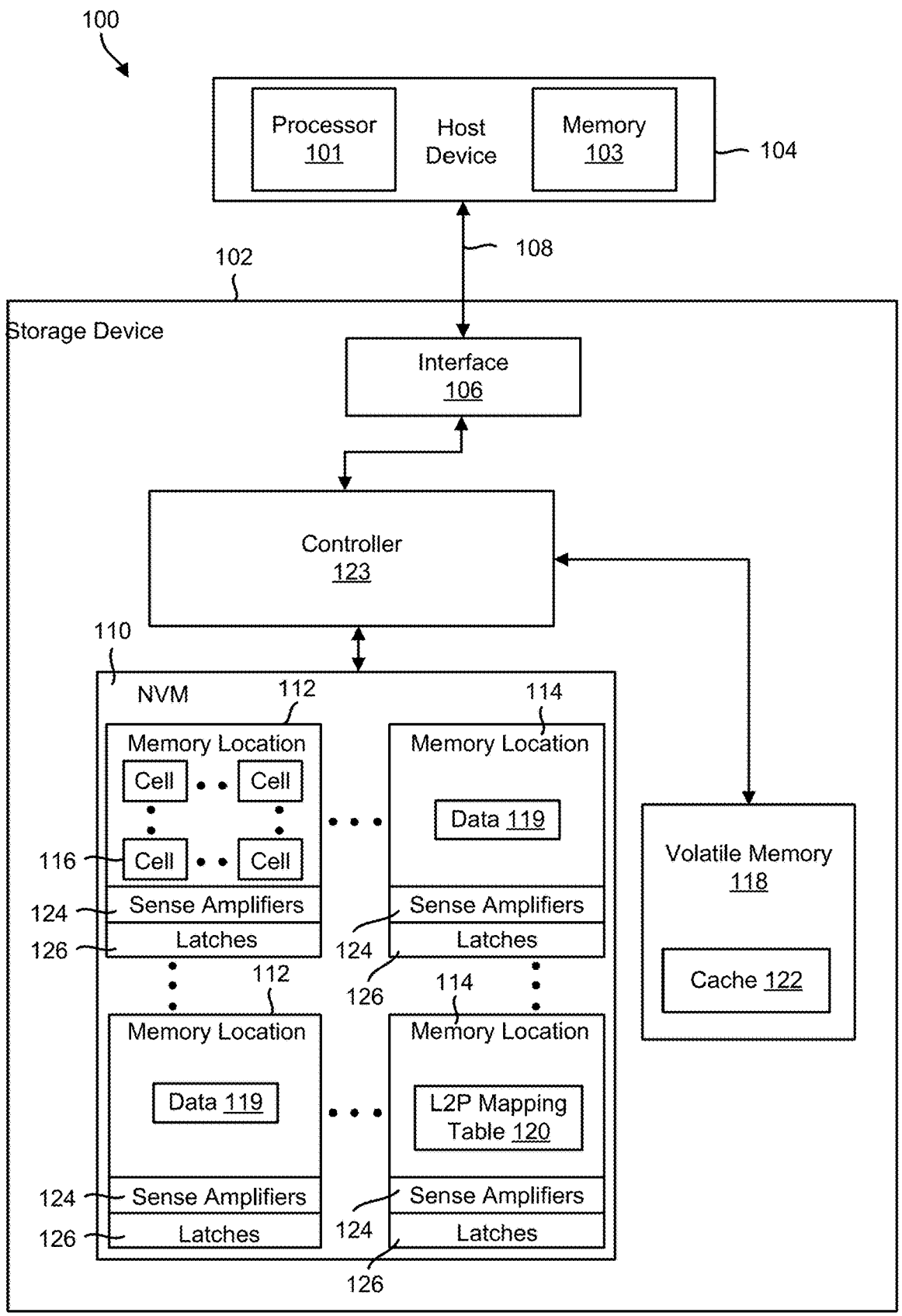
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

Aspects of the present disclosure are directed to techniques for end-to-end protection checks on data written to and read from a storage device. Unlike conventional approaches, the techniques described herein provide for protection checks specifically corresponding to the assigned physical memory location of the data. Thus the protection checks performed when a read request is issued ensure that the physical memory location is in fact storing the correct data—namely, the requested data.

These techniques are characterized as being end-to-end in that, throughout the entire design flow of a memory write operation, the integrity of the data is always ensured using one or more checks before the data is stored in the correct physical location. The data word is not, by contrast, manipulated prior to being stored and then left unchecked. One significant advantage of these embodiments is that the described design flow does not require added data bits or extra data fields in the metadata of the applicable data word, which would otherwise consume additional bandwidth reserved for storage of data. The bandwidth consumption in these latter cases would be significant, because the use of extra bits would apply to every data word. The techniques described herein do not require further data to solve the aforementioned problems with conventional storage devices, and therefore the size of the data words can beneficially stay the same as in conventional data words.

Another significant benefit of these aspects of the disclosure, as described in more detail below, is that the described techniques for replacing a logical checksum with a physical identifier impose no added time latencies to the system. As detailed herein, the data integrity checks based on the physical address can be conducted in parallel with existing logical checks or other pre-storage processing tasks, meaning that the physical tag generation adds no further delays or consumes no extra time that could otherwise cumulatively result in significant memory delays. These above-referenced benefits are but a few of several distinct advantages to the various embodiments of this disclosure.

In other aspects of the disclosure, the controller also ensures that (unlike prior approaches) the data read back from a system is checked against the physical location in which the data is stored to ensure that the data is the correct version, that bit-flips have not occurred in the interim time between write instructions and storage of the data word, and that the data was not otherwise corrupted at the physical address level.

A page or other logical entity stored to NAND may include metadata for protection checks. The metadata may be included with a data word and then encoded with the data prior to being written to memory as a code word. The metadata may include, for example, cyclic redundancy check (CRC) fields, which are sometimes referred to herein as SPCRC fields. Additional metadata may include table index fields (e.g., SPPI fields) to enable logical address checks, as well as key version fields (see FIGS. 4-6). The encoded data word may also include parity data for error correction. Data in the form of code words may be written to the NAND storage array using a physical address specified in a logical to physical mapping (L2PM). The L2PM may be included in a L2P table, which may be a table stored in a controller-accessible memory that includes physical addresses that correspond to logical addresses (see FIG. 2).

Conventionally, the code word itself lacks any fields, in its metadata or otherwise, that indicates a discrete physical location identifying where the code word is stored. That is to say, the data word lacks a physical identifier in its metadata that may allow a controller to discern the identity of the physical memory location of the data word via metadata. The absence of such information can be problematic under various circumstances. For example, if the code word happens to be written to the wrong physical memory location but its logical block address (LBA) nonetheless matches the LBA being sought, the logical protection checks in place for the data word having the LBA are likely to pass. Thus the controller will send the wrong data to the host. The effective result is silent data corruption, where the incorrect data is surreptitiously provided to the host unbeknownst to either the host or the controller.

In one aspect of the disclosure, the problem of this silent data corruption is solved by replacing a metadata field with a tag generated concurrently with a logical check of a data word. In various embodiments, the physical address to where the code word is stored is used to generate the tag or seed to the encoder. The controller may include an engine, such as controller logic, software, firmware, dedicated hardware (e.g., application specific integrated circuit(s) (ASIC), reduced instruction set computer (RISC) processor(s), digital signal processor(s) (DSPs), combinational logic, etc.) or one or more central processing units (CPUs) that run code, or any combination of the foregoing.

As an exemplary embodiment, the engine may receive the write instruction along with the data page, chunk, word or similar logical entity. The engine may prepare the page/chunk/word just before it is encoded. For example, the engine may receive the data word with metadata including the CRC data field. The engine may use the CRC data (and potentially other metadata) to perform a logical address check on the data word, which may be one of a plurality of logical checks performed at various processing stages to ensure accuracy of the data. In addition to this logical check, and responsive to the write instruction and LBA from the host, the controller may identify the physical memory location for the data word based on a logical-to-physical (L2P) mapping table. At that point, the controller has the physical memory location to which the encoded data word will be stored.

Accordingly, in various embodiments, and contemporaneous with at least a portion of the above-referenced logical check using the CRC metadata (e.g., spCRC), the engine may generate a tag or seed for providing to the encoder. The tag or seed may be based on the identity of the physical address in the L2P table. The tag, or the seed to the encoder, may be in some examples the physical address itself, or in other examples, the tag/seed may be a unique identifier that enables the controller to identify the physical address using the tag and an algorithm. Beneficially, in these embodiments, the fact that the tag/seed is generated during the logical check (the latter of which is already performed in conventional systems) means that the controller does not have to utilize extra clock cycles to generate the tag. Rather, the tag can be generated during the pendency of the logical check, such that when the logical test is completed (e.g., the controller determines that the checksums for the data word passed), the tag/seed has already been generated and/or provided to the encoder.

Thus, when the data word is encoded in accordance with these embodiments, the SPCRC data field (which has now been used) is replaced with a mediaCRC or mCRC. The mCRC may include the generated tag itself, or it may instead be a CRC value based on the tag, and, e.g., created during the encoding process. The engine can also generate the encoder seed based on the physical address assigned to the data word. In either case, the SPCRC data field can now be replaced with a value that allows the engine to perform data integrity checks based on the physical address during subsequent memory read operations.

Because the logical check was performed on the data using the CRC information and/or other data, the embodiments of the present disclosure provide end-to-end data protection, meaning that there is no period of vulnerability wherein inadvertent data errors will go undiscovered. In the example above, the SPCRC data was used prior to encoding to ensure that there were no logical defects with the data word generated during the front end portion of the write operation. Concurrent with this procedure as noted, the tag representing the physical address may be generated. That tag can be immediately encoded, or a modified value (e.g., mCRC) can be inserted into the code word just before it is stored in the applicable physical memory location. Thus the data word is not left vulnerable, since the different specified checks are still performed, and the physical tag is generated in a transparent manner concurrent with the logical check, without incurring additional clock cycles during which an inadvertent bit flip could otherwise occur.

This continuous ability to check the logical identity all the way through the processes in the storage controller also means that the logical CRC check using the upper layers of code can identify any firmware bug. Thus, while the tag based on the identifier protects the system from a physical error (e.g., the NAND flash memory returning the wrong data version), the upper coding layers concurrently can protect the system against a firmware error or another logical bug.

In some embodiments, the tag generation need not necessarily occur contemporaneously with the CRC check. Instead, the tag generation may be performed (in part or in whole) during other preexisting front-end processing events.

The benefits of the eTAG and/or the mCRC are especially evident during a subsequent read operation. Upon receiving the read request, the controller can retrieve the code word at the physical address associated with the logical address provided by the host in the request. After the data word is decoded, the engine can extract the mCRC or tag present in the retrieved data, and compare it with the expected mCRC or tag that is received as part of the read request. In some embodiments, the engine can instead compare the decoded mCRC with a separate mCRC that is generated using parameters that are identical to those previously used to generate the mCRC. If the decoded mCRC or tag retrieved from the memory location fails to match the expected mCRC or tag, the engine can then return the mCRC that was read (or seeded). This returned metadata can, in some embodiments, be used by the engine to re-calculate the physical address used to generate this mCRC (or tag/seed), thus enabling the controller to detect a failure and also to provide information that may be used to help identify which physical location on the flash media had the actual failure. The identified information can be shared with the host as necessary.

Another significant benefit of this aspect of the disclosure is that no additional data requirements are imposed on the system. For example, the mCRC that includes (or is based on) the tag can be used to replace the existing SPCRC data field without adding any bits to the data word. Further, because the logical check using SPCRC was already performed prior to writing the data, the replacement of SPCRC with mCRC can be made without subjecting the data to any periods of vulnerability. Thus, although one possible fix to this problem is to add another field to the metadata in the data word for encoding a physical identifier, such a workaround would reduce the amount of data in each word, thereby substantially reducing overall data capacity. The present embodiments do not require any such data reduction and have no effect on the existing data capacity.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
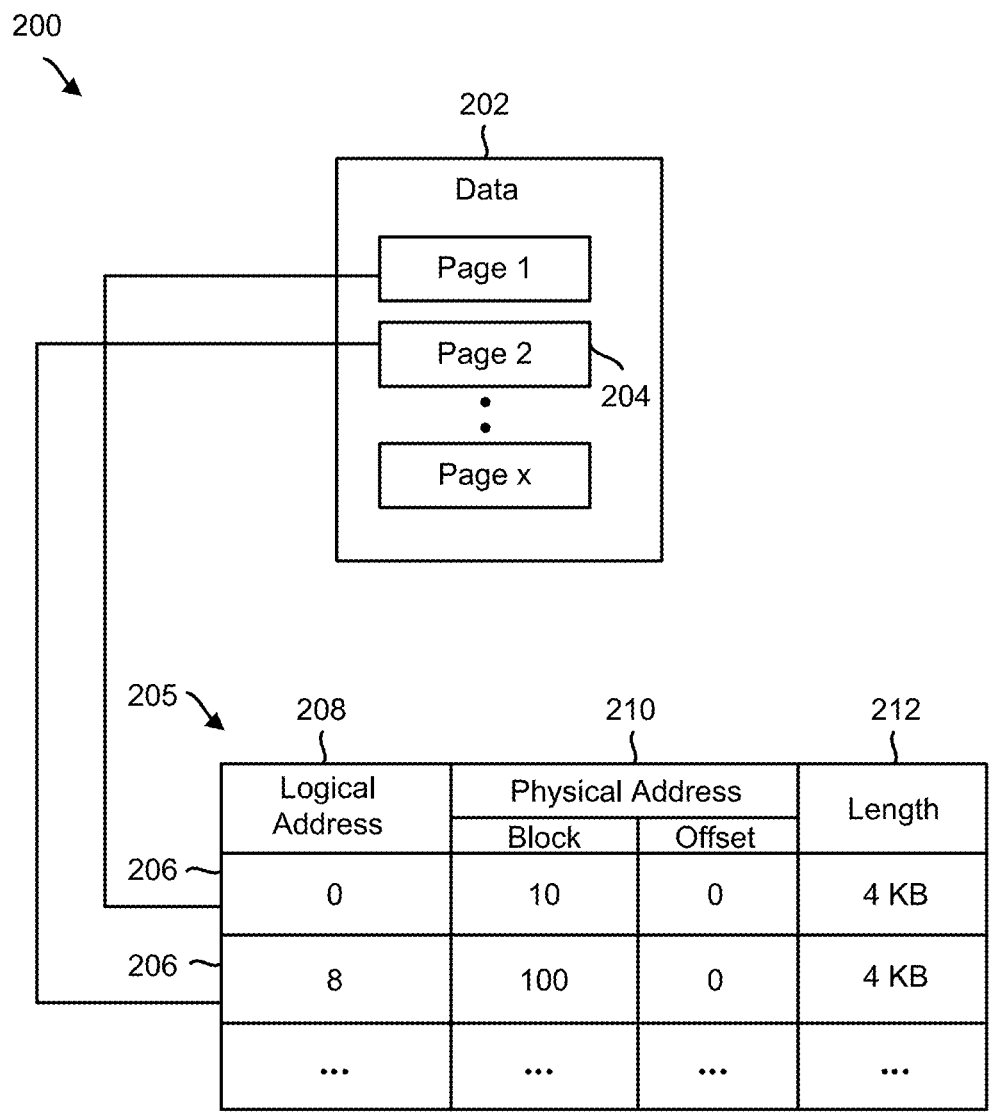
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size). While the mapping table 205 may be generally applicable to read and write operations, in various embodiments, an identical or similar such mapping table may be used in connection with mapping logical-to-physical addresses for data latches. A table of the form in FIG. 2 may be used for identifying logical-to-physical mappings during the latter portion of the POR procedure described herein.

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. Conventionally, if a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. The data latches may in some embodiments include XDL latches. The XDL latches may be used as cache memory for purposes of the storage device described herein. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

In an exemplary embodiment, a host device may write data to non-volatile memory. When the device subsequently reads the written code word, it is desirable to ensure that the decoded data is identical to the data previously written, and to do so in a manner that optimally uses no extra bits. It is further desirable in other embodiments that the device can provide this protection without using extra clock cycles. Moreover, it is desirable, in the event of an error, to provide information that may assist a host or a storage controller in identifying the source of the error, rather than merely announcing the presence of an error (or worse, missing the error altogether, as is conventionally the case).

To the accomplishment of these objectives, it is further desirable to ensure that during front end processing of write operations, no gaps are left open such that the data may become inadvertently corrupted, and the corruption missed. Aspects of the present disclosure therefore are targeted to provide end-to-end protection as the write instructions are processed from the front end up to the actual storage in memory. This end-to-end protection may be both logical protection (e.g., using upper code layers) and physical protection.

Data can become corrupted in multiple ways. Corruption may inadvertently occur when the data is encrypted. Due to a sudden voltage spike, noise, or related factors, a logical zero may turn into a logical one, or vice versa, as metadata is appended to the data or during other processing operations. Also, data corruption may inadvertently result when a several different versions of data are being stored and processed at or near the same time. For these reasons it is desirable to have both logical and physical checks for the data. Conventional non-volatile memory systems generally include logical checks, but not physical checks that ensure that the data requested in a read instruction is identical to the data retrieved.

The logical block address (LBA) is generally made part of the metadata accompanying a data word. This way, if a block is being written, for example, inclusion of the LBA helps ensure that the written data is not a prior version of the data, garbage data, or the like.

Unfortunately, even if the LBA is inserted in a written block, the logical metadata may cause the controller to occasionally misidentify an earlier version of the data as current. In this case, the controller that interprets the logical metadata will conventionally provide the stale data to the host.

Figure 3:
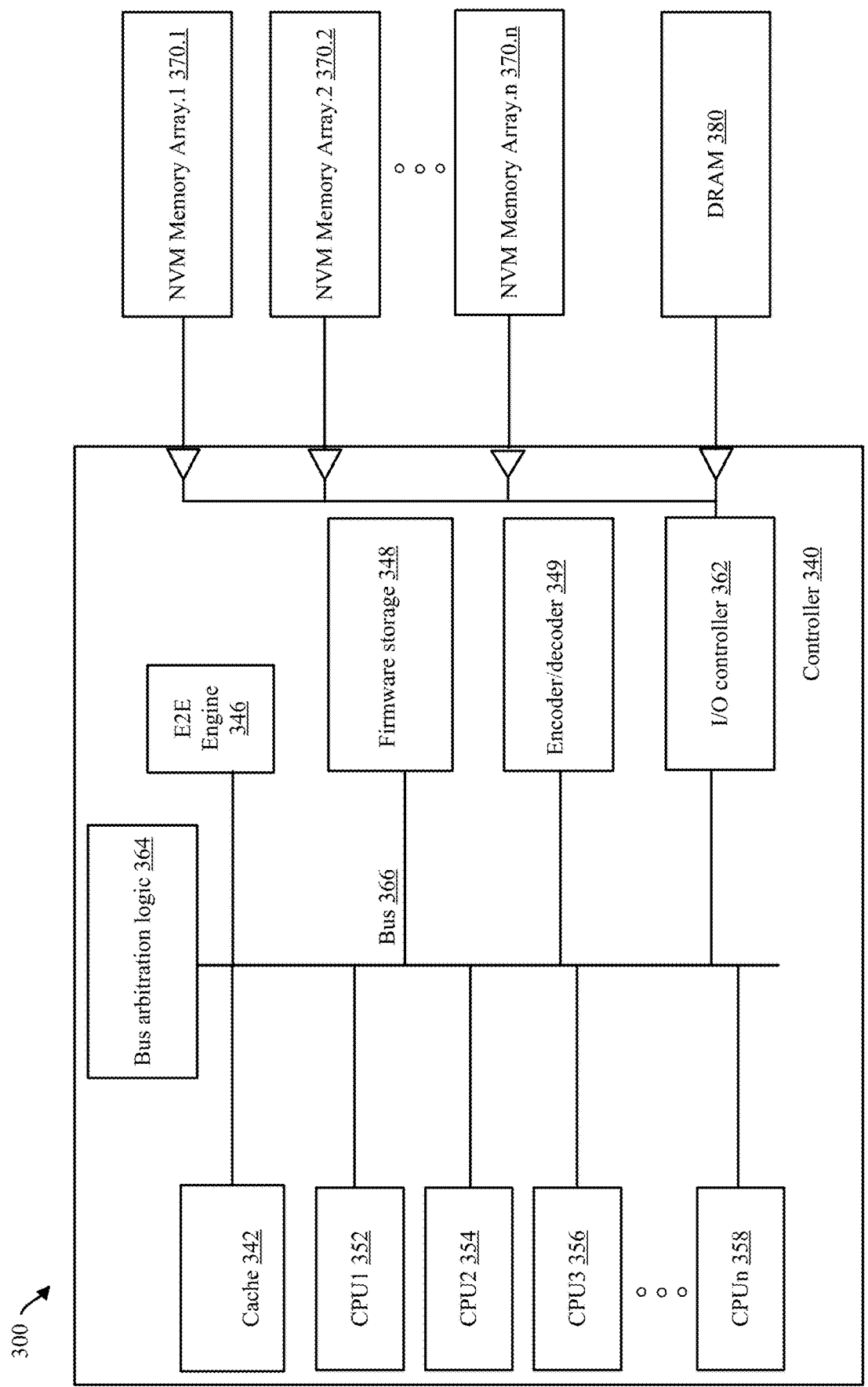
FIG. 3 is a conceptual block diagram of an exemplary hardware device for performing functions according to various embodiments herein.

FIG. 3 is a conceptual block diagram of an exemplary hardware device 300 for performing functions according to various embodiments herein. The hardware device 300 may, in one embodiment, include a non-volatile flash memory device including a storage controller 340 for controlling memory read and write operations to and from a host device, for example. Controller 340 may also oversee tasks such as performing garbage collection, address translation, erase operations, and the like. In various embodiments, hardware device 300 may include a plurality of n non-volatile memory (NVM) arrays 370.1-370.n, with n being some positive integer representing the total number of NVM arrays. NVM arrays may, in some embodiments, represent a corresponding plurality of memory planes. In some embodiments, more than one controller 340 may be used. In the embodiment of FIG. 3, controller 340 includes a plurality of central processing units (CPU1 352, CPU2 354, CPU3 356 . . . CPUn 358), where n need not equal the number n of NVM arrays. In some embodiments, a single CPU is used. One or more of these CPUs, or a portion thereof, may include the above-described engine for front end processing of data writes, and for generating a tag, seed, or mCRC. In other embodiments, a dedicated end-to-end (E2E) engine 346 may instead be included for governing data checks and for generating tags for use in data or code words. In still other embodiments, the code for executing functions relating to tag generation and data checking may be present in firmware device 348, which may store or execute firmware for use in processing signals herein. Firmware device 348 may be updated as necessary to provide upgrades and bug modifications, if applicable. The firmware device 348 may provide code that can be executed on one or more of the CPUs 352, 354, 356, or 358. In other arrangements, the firmware in the firmware device 348 may be executed in E2E engine 346. In still other embodiments, E2E engine 346 may execute code retrieved from cache memory 342, or from one of the NVM arrays 370.1-370.n. An I/O controller 362 may be used as an intput/output storage interface of controller 340, as data is sent to and from NVM arrays 370.1-370.n. The I/O controller 362 may work in concert with any of the processing devices on controller 340 as well as bus arbitration logic 364, the latter for sending and receiving data on the bus 366.

The cache memory 342 may also be used by the controller 340 for quick access to frequently-used data and code. In some embodiments, cache memory 342 may be used to store an L2P mapping table for quick reference. Controller 340 may further include an encoder/decoder 349. Encoder/decoder 349 may be hardware based, or in other embodiments, it may be executed in software. In some embodiments, the encoder and decoder are separate hardware elements. During a data write operation, encoder 349 may be used to encode a data word including metadata as a code word for subsequent storage in the physical memory location specified for the logical address of the data word in the L2P table. The tag/seed generated in E2E engine 346 or by one of the CPUs 352, 354, 356, or 358 may be sent over bus 366 to the encoder/decoder 349, at which point the encoder 349 may seed the data word with the mCRC value.

Further, upon receipt of a read request, the decoder portion of encoder/decoder 349 may decode the code word at the physical address identified in the L2P table using the corresponding logical address received from the host, at which point the mCRC or seed may be compared with an expected value, e.g., a value provided by the host with the read request, or another value previously generated to correspond to that memory location (or to a tag related thereto). Bus arbitration logic 364 may further be provided on controller 340 to give different devices access to the bus as is generally known in a conventional bus architecture.

DRAM 380 may be coupled to controller 340. DRAM 380 may be used to store data and instructions for faster access, and to store data that will subsequently be stored along with metadata in a specified one of the NVM arrays 370.1-370.n.

In some embodiments, NVM arrays 370.1-370.n may correspond to different planes of NAND storage devices. In other embodiments, each of the NVM arrays 370.1-n may be included on its own physical die for storing dedicated non-volatile memory. In other configurations as noted previously, NVM arrays 370.1-370.n may include different types of non-volatile memory, and need not be restricted to NAND memory.

A conventional front-end data flow describing an initial write observation will be described with reference to FIGS. 4-6. When a write instruction is initially received from the host, the physical address corresponding to the data to be written is unknown at that present time. To accommodate this lack of knowledge, the controller can conduct logical checks using certain metadata and an SPCRC to help protect the data integrity as the data is routed through the controller stages in preparation to be physically written to the non-volatile storage.

Figure 4:
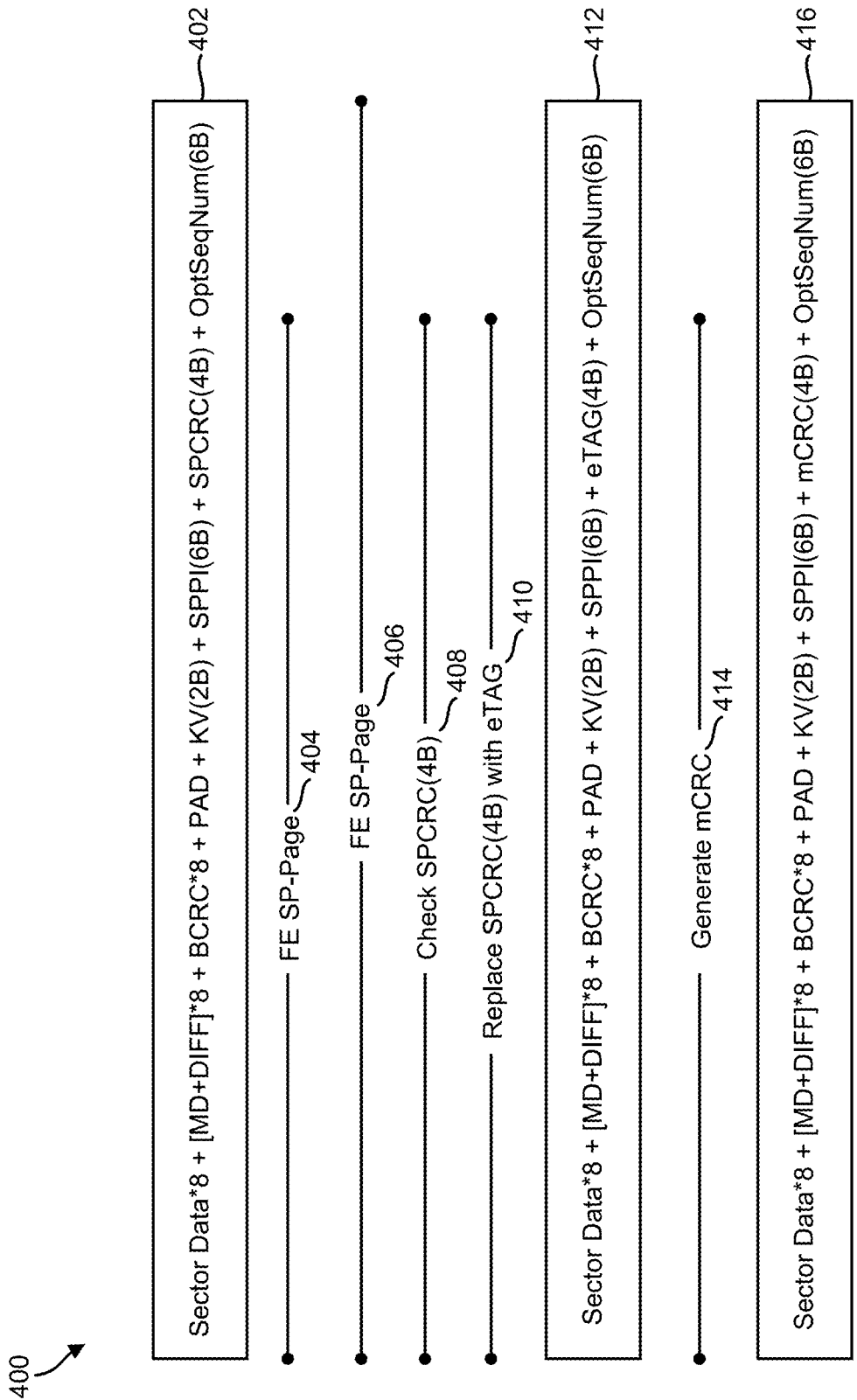
FIG. 4 is a flow diagram of an exemplary data word as it evolves through time during an example processing and execution of a write instruction.

FIG. 4 is a flow diagram 400 of a data word 402 as it evolves through time during an example processing and execution of a write instruction. The processes and functions described in FIG. 4, including the functions described in the metadata fields, may be performed by one or more of the circuits or systems described in FIGS. 1-3. Notably, the data word and related information can also be described as a data flow process moving from left to right in FIG. 4 and also moving from the top down. In the embodiment shown, the data chunks are manipulated at the level of a code word, which includes encrypted user data plus protection data for error detection and correction. In other embodiments, different logical and data structures corresponding to different types of non-volatile memory may be used without departing from the spirit and scope of the present disclosure.

Shown in the first row of FIG. 4 is a data word 402 that may be constructed at a front end of a memory device during an initial write operation, such as when a controller 430 receives a write instruction along with data and a logical block address. A wide variety of different types of data and metadata structures and fields are possible, and the present data fields are shown for illustrative purposes only.

In the embodiment of FIG. 4, the data word 402 includes sector data field ("Sector Data*8), which is encrypted data also referred to as a logical block. The sector data field is followed by ([MD+DIF]*8) data (where DIF is the data integrity field, the latter of which includes information for assisting with logical data integrity), and block-CRC data (BCRC*8). The block CRC data is configured to identify logical errors in the encrypted sector data. The sector data may include user data, and the three fields above may be collectively encrypted as an encrypted sector. For an embodiment using NAND storage, a full sector protection (SP) block may include eight total encrypted sectors (see FIG. 5). The data word 402 may also include a (PAD) data field, or some padding bits made available to ensure that the final encrypted page includes a specified number of bytes. The field KV(2B) is an indicator of the two-byte key version of the memory. The SPPI(6B) (sector protection page index) is a six-byte page index, or the index of the current sector protection (SP) page.

It is generally in this first portion of the data field that the logical block address corresponding to the data is present. The data may include additional checksums for assisting with the integrity of the user data, as well as data used for upper level code checks and other logical metadata. While this included data is necessary, it is generally not sufficient in the sense that it cannot guarantee (for all the reasons described herein) that the host read will be getting back exactly what it expected on all reads. As one example, if the computed checksums match an earlier version of the data, then using conventional techniques, the host may be provided with that earlier version silently (i.e., without an error message or other indication that the data is not current).

The SP block includes 8LBs or logical blocks (i.e., the first half of the encrypted sector data). The SP block may also be referred to as the SP page. The index for that page is the SPPI (the SP page index). A six-byte optional sequence number may also be included.

Referring still to FIG. 4, the SPCRC ("sector protection cyclic redundancy check") field in data word 402 is a required four-byte sector processing CRC value directed to the current SP block. As the sector data is received from the host and moves through the controller during front end operations, the SPCRC along with the other checksums can generally be used to check the logical integrity of the data at different layers to help ensure that the metadata and user data are error-free. Accordingly, in an embodiment of the disclosure, two sequential front-end FE-SP-Page operations 404 and 406 are performed, during which the controller may access the L2P table to determine the physical address. The controller may perform a logical check (408) using the SPCRC value. In some embodiments as noted above, the generation of the physical tag can take place during the logical check (408) once the physical address is obtained, such that the tag can be generated without adding further clock cycles or latencies to the overall write procedure. Once the logical check using SPCRC passes, the SPCRC(4B) can be replaced with the error tag eTAG at step 410. At that point, the data field 412 is identical to the data field of data word 402 except that the eTAG (4B) has replaced SPCRC (4B).

In various embodiments, the tag is generated to seed the encoder with a new physical-based CRC value. Thus, during step 414, the controller may generate an mCRC code of four bytes in this example for use in performing a CRC to identify a physical error. In this step 414, the mCRC can be created such that the physical address identified from the L2P table can also be retrieved using the mCRC value. Additionally or alternatively, the mCRC value can be used to retrieve the eTAG value, which in turn can be used to recreate the physical address. In various embodiments, the mCRC is generated at a stage where the controller, encoder or other circuits are currently performing a separate necessary task so that the generation of the mCRC does not consume extra clock cycles. In some embodiments, this task during which the mCRC is generated may include the latter portions of the SPCRC check. The end result is the data fields in data word 416, which is identical to that of 412 except that in this embodiment, an mCRC data value of four bytes has replaced the eTAG(4B) value. The field in data word 416 is now ready to be encoded and stored in the identified physical address.

The above-described replacement of SPCRC with eTAG and mCRC is performed in band, i.e., in parallel with other write operations. Further, to ensure that the data is not left vulnerable during any point in time, the replacement is performed as an atomic operation. That is to say, the replacement operation in this embodiment is an indivisible operation to ensure that the data is never left without a checksum. Advantageously, this procedure is performed without adding bytes to the data field. Further, in this embodiment, the existing checksum can be replaced at a point in the process where the physical address is known, such that any data corruption that may occur during the replacement process can subsequently be uncovered (e.g., in a later read request) using eTAG or the mCRC. In various embodiments, the time it takes the controller to generate eTAG and mCRC is no greater than the time for the controller to verify the checksum using the SPCRC. In this way, the atomic replacement operations can be performed without any added clock cycles or latencies.

It will be appreciated by those skilled in the art upon perusal of this disclosure that the data fields, their sizes, and functions are exemplary in nature. In other embodiments, different values may be used, and a different order of events may transpire to yield a similar result and the attendant benefits. For example, in some embodiments, the generated eTAG(4B) may only be performed as one step, in which event eTAG(4B) may be used in lieu of a separate mCRC to perform the physical error detection. Also, the fields in other embodiments may have different names with different functions, without departing from the spirit and scope of the disclosure. For purposes of this disclosure, the "tag" may include the mCRC value.

Figure 5:
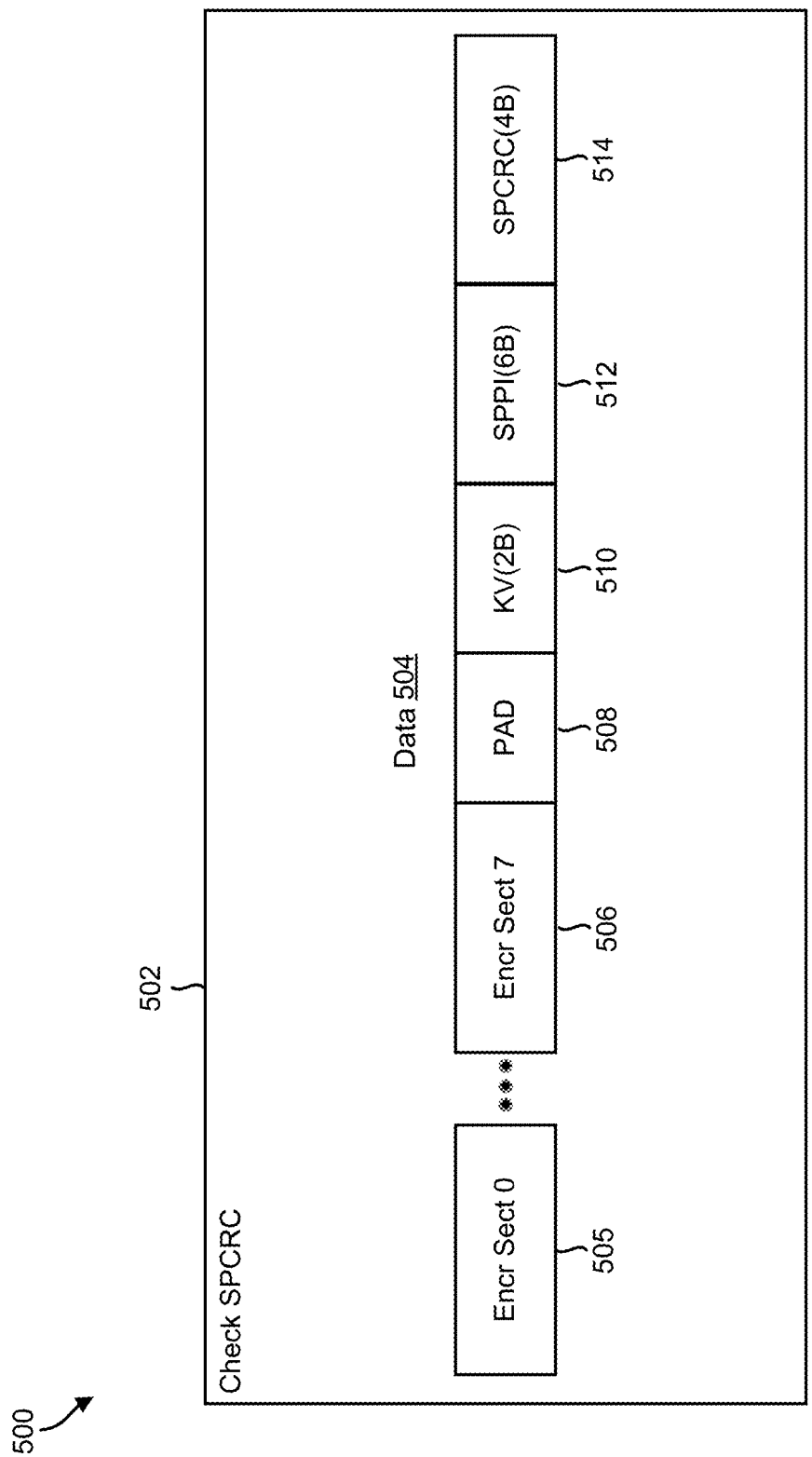
FIG. 5 is a conceptual flow diagram for performing techniques according to embodiments herein.

FIG. 5 is a conceptual flow diagram 500 for implementing techniques according to embodiments herein. The functions described in the metadata fields of FIG. 5 may be performed by one or more of the circuits or systems described in FIGS. 1-3. FIG. 5 shows, in particular, an example state of data word 504. FIG. 5 shows the various consolidated data fields 505 and metadata used during the processing of a write operation and for performing the logical check spCRC (502). The data fields identified as Encr Sect 0 (505) through Encr Sect 7 (506) generally correspond to the sector data and the MD-DIFF field in the first part of the data fields of data word 402 as the fields change in subsequent data words 412, 416 (FIG. 4). Thereafter, PAD 508, KV(2B) 510, SPPI(6B) 512, and SPCRC(4B) 514 all correspond to the same values described above in connection with FIG. 4.

Referring to FIG. 5, the logical check spCRC (502) conducted using SPCRC 514 prior to its replacement enables the beneficial end-to-end nature of the flow of data protection during a write operation. The upper code layers can use the SPCRC check to detect logical bugs prior to the replacement. In one embodiment, only if the check passes does the algorithm proceed to replacing SPCRC with the generated tag or CRC value. The data can then be immediately stored thereafter in the identified memory location, and thus all logical checks necessary have been performed during the front end processing of the data.

Figure 6:
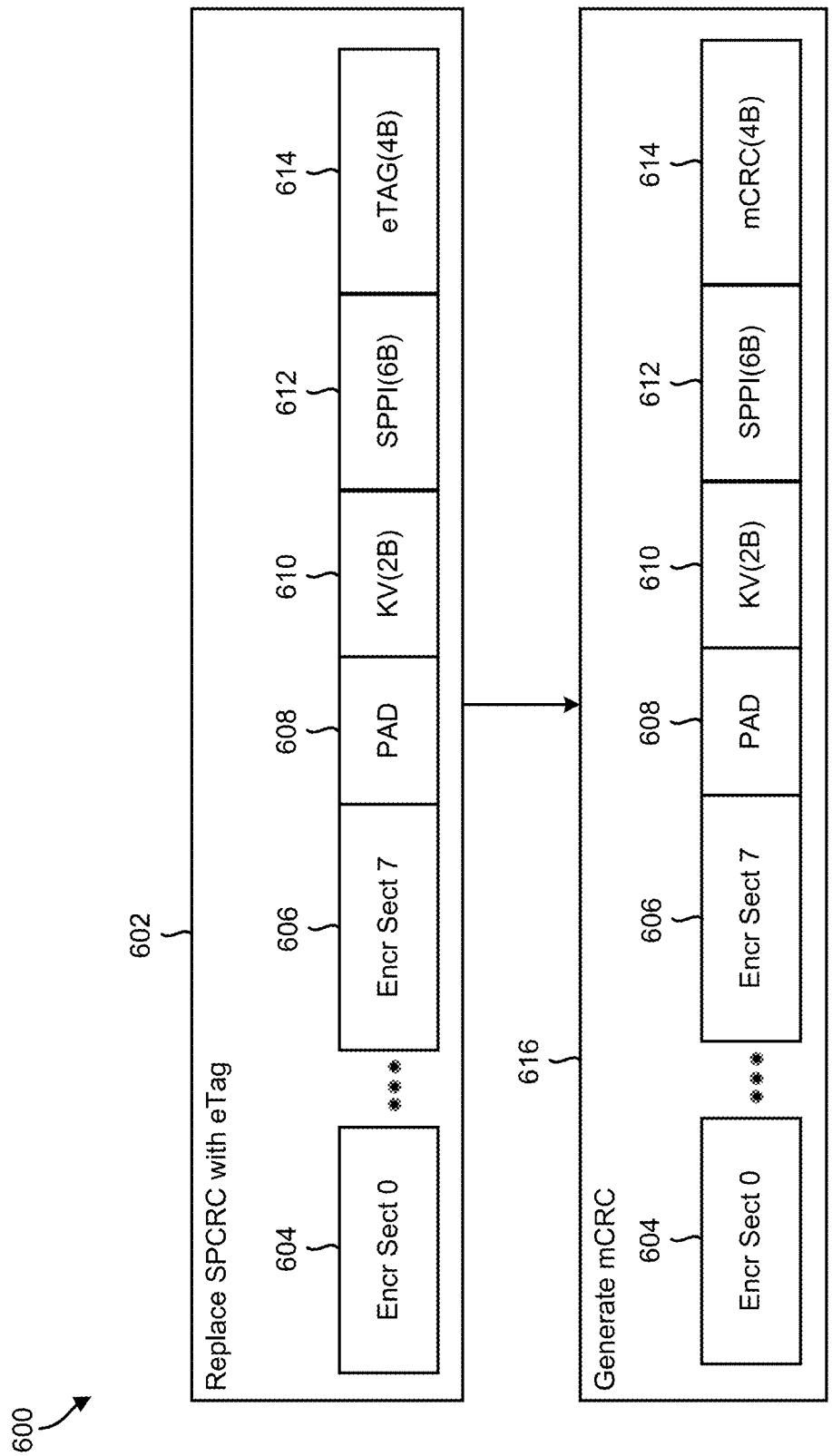
FIG. 6 is another conceptual flow diagram for performing techniques according to embodiments herein.

FIG. 6 is a conceptual flow diagram 600 for implementing techniques according to embodiments herein and following the exemplary SPCRC check described with reference to FIG. 5. Like with respect to FIGS. 4 and 5, the processes described in FIG. 6, including the functions identified in the various metadata fields, may be retrieved and/or performed, as applicable, by one or more of the circuits or systems described in FIGS. 1-3.

At 602, the SPCRC value is replaced with the eTAG 614 generated during the logical check using the identified physical address. It is assumed for purposes of this example that the SPCRC logical check passed. The data field including the Encr Sect 0 (604)-Encr Sect 7 (606), PAD 608, KV 610 and SPPI 612 are otherwise identical to the field in FIG. 5.

In step 616 of FIG. 6, the mCRC is generated based on the eTAG. The mCRC may be configured to enable a subsequent CRC operation. In some embodiments, the mCRC is generated immediately after (or concurrent with) the generation of the eTAG 614. The data word in step 616 is identical in this embodiment to that shown in step 602, except that the controller/engine has replaced eTAG 614 with mCRC 614. In some embodiments, generation of mCRC is not performed, and the eTAG 614 is instead the final value in that data field prior to storing the data. Once the mCRC is inserted in step 616, then the data field is encoded and the code word is stored in the physical address corresponding to the logical address received with the write instruction.

The storage of mCRC in field 614, among other benefits, assures that subsequent read operations will not end up retrieving outdated versions of the requested data, or corrupted data. For example, when a read request is received for any logical address, the corresponding physical address is identified in the LBA table (FIG. 2). The code word is retrieved and decoded. The value in mCRC is checked against an expected value to confirm that a match exists. If a match exists, then the controller can confirm on the fly that the data requested is identical to the data provided. For example, the controller can simply send to the host device the retrieved data.

In sum, in the embodiments of FIGS. 4-6, the controller can receive the data from the host, can use the L2P table to determine which memory location to write the data, and, knowing the physical address at that stage, can write the physical identifier at the same time the checksum is performed. The read operation includes using the stored physical identifier to confirm the data is as requested. In one embodiment, the read request can be received with a logical address and an associated tag. The controller may look up the physical address via the logical address and then may compare the tag in the retrieved data in memory with the tag provided by the host to determine whether they match. In other embodiments, the host need not provide a tag, and the mCRC may be compared with an expected value generated or stored by the controller.

While specific embodiments have been described, the principles of the present disclosure can be applied to any non-volatile memory in which metadata is used to check data integrity. For example, suitable variations of the principles herein may also be applied to NOR memory, solid state and flash memory drives, among other technologies.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a memory comprising non-volatile memory elements for storing data; and
a controller coupled to the memory and configured to:
receive a write instruction including a data word and a logical address;
include, with the data word, metadata including error detection data;
identify a physical address in a mapping table based on the logical address;
generate a tag corresponding to the identified physical address; and
replace the error detection data with the generated tag or value based thereon before writing the data word to the physical address in the memory.

2. The storage device of claim 1, wherein the controller is further configured to perform a logical error check using the error detection data, and to generate the tag during the logical error check.

3. The storage device of claim 1, wherein the controller is configured to generate the tag concurrent with one or more operations corresponding to processing of the write instruction.

4. The storage device of claim 3, wherein the controller is further configured to write the data word to the physical address in the memory.

5. The storage device of claim 1, wherein the controller is further configured, upon receiving a read request with the logical address, to compare a tag in a data word retrieved from the memory based on the logical address to the generated tag or the value, or to an identically-generated tag, to determine whether a match is present.

6. The storage device of claim 5, wherein when a match is not present, the controller is configured to return an error message or the generated tag to a device that issued the read request.

7. The storage device of claim 1, wherein the value of the tag comprises the physical address or an encoded representation thereof.

8. The storage device of claim 1, wherein the error detection data comprises cyclic redundancy check (CRC) data.

9. A storage device, comprising:
a plurality of non-volatile memory elements for storing data; and
a controller configured to:
perform a logical check on a data word included in a write instruction from a host, including comparing an error detection code in the data word to another value;
identify a physical address for writing the data word when the logical check passes;
generate, during the logical check, a tag using the physical address; and replace the code with the tag before writing the data word to the physical address.

10. The storage device of claim 9, wherein the tag comprises a first version corresponding to the generated tag and a second version based on the first version and used for replacing the code.

11. The storage device of claim 9, wherein the error detection code is included in a metadata field of the data word.

12. The storage device of claim 9, wherein the code comprises a cyclic redundancy check (CRC) code.

13. The storage device of claim 9, wherein the controller is further configured to encode the data word using the tag prior to writing the data word to the physical address.

14. The storage device of claim 9, wherein, the controller is further configured to:
receive a read request from a host;
identify a physical address based on a logical address included with the read request:
compare a tag in metadata retrieved from the physical address with an expected value;
send data to the host responsive to the read request when the tag matches the expected value; and
send to the host an error or the tag when the tag does not match the expected value.

15. The storage device of claim 14, wherein the expected value comprises the value of the tag generated during the logical check or a value of a tag generated thereafter in an identical manner.

16. The storage device of claim 9, wherein the controller is further configured to perform the logical error check prior to encoding the data word for storage at the physical address.

17. A storage device, comprising:
a plurality of non-volatile memory locations for storing information; and
a controller configured to:
generate an error code to include with data received in a write request;
identify a physical address based on a logical address included with the write request;
replace the error code with a tag identifying the physical address; and
write the data with the replaced error code to the physical address.

18. The storage device of claim 17, wherein the controller is further configured to perform a logical check of the data received in the write request using the generated error code.

19. The storage device of claim 18, wherein the controller is further configured to generate the tag contemporaneously, at least in part, with performing the logical check of the received data using the error code.

20. The storage device of claim 17, wherein the controller is further configured to:
receive a read request including the logical address;
retrieve the data corresponding to a physical address mapped to the logical address;
compare a tag included in metadata corresponding to the read request with the tag in the retrieved data to determine whether a match exists;
send the data to the requesting entity when the tags match; and
send one or both, to the requesting entity, an error or the tag in the retrieved data when the tags do not match.

* * * * *